UNITED STATES PATENT OFFICE.

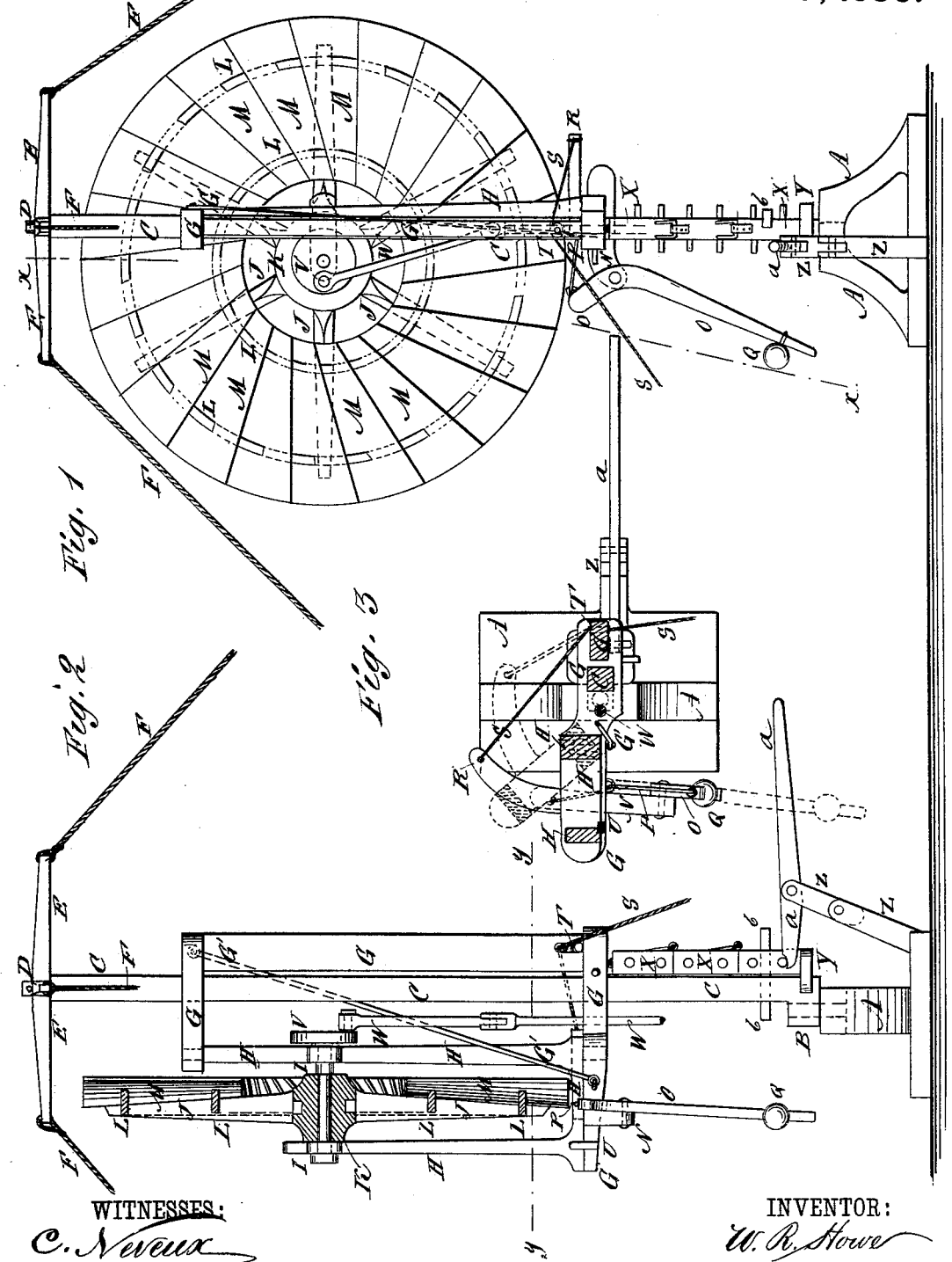

WILLIAM R. HOWE, OF BALTIMORE, MICHIGAN.

WINDMILL.

SPECIFICATION forming part of Letters Patent No. 233,510, dated October 19, 1880.

Application filed March 25, 1880. (No model.)

*To all whom it may concern:*

Be it known that I, WILLIAM RILEY HOWE, of Baltimore, in the county of Barry and State of Michigan, have invented a new and useful Improvement in Windmills, of which the following is a specification.

Figure 1 is a front elevation of the improvement. Fig. 2 is a sectional elevation taken through the line $xx$, Fig. 1. Fig. 3 is a sectional plan view taken through the line $yy$, Fig. 2.

Similar letters of reference indicate corresponding parts.

The object of this invention is to furnish windmills so constructed that they will turn themselves to and from the wind as the wind falls below and rises above a given pressure without the aid of a separate vane, and which may be readily raised and lowered when desired.

A represents the base frame or support, which is designed to be anchored to the ground directly over the well from which the water is to be raised. In the base-frame A is formed a hole to receive the pivot B, attached to the side of the lower end of the main post C, that carries the wind-wheel. The pivot B is perforated longitudinally for the passage of the pitman that works the pump or other machinery to be driven. Upon the upper end of the post C is formed a pivot, D, which works in a bearing in a wheel or frame, E, to which are attached guy rods or chains F, to hold the post C in an erect position.

G is a frame, consisting of a longitudinal bar attached at its ends to the ends of two cross-bars, which cross-bars have holes formed in them to receive the post C, the said holes being in such positions that the post C may be parallel with and close to the inner edge of the side bar of the frame G. The frame G is strengthened by a brace-rod, G', as shown in Fig. 2.

To the cross-bars of the frame G, at a little distance from the post C, are pivoted the ends of the inner side bar of the frame H. The frame H consists of a longer inner side bar and a shorter outer side bar, connected at their lower ends by a cross-bar.

To the side of the inner side bar and the upper end of the outer side bar of the frame H are attached bearings I, in which revolve the journals of the wind-wheel. The frame of the wind-wheel consists of radial arms J, attached to a hub, K, and connected by ring-bars L.

To the ring-bars L are attached the wings M, which are made wider at their outer ends, are inclined laterally, and are arranged diagonally, as shown in Fig. 1, so that the wind may strike the wings without being obstructed by the frame of the wheel, and in such a direction as to produce the best effect.

To the lower cross-bar of the frame G is attached an arm, N, to which is pivoted a lever, O. The inner end of the lever O is curved upward, and is connected with the cross-bar of the frame H by a rod or chain, P.

To the outer part of the lever O is attached a weight, Q, of sufficient gravity to hold the wheel to the wind under ordinary circumstances; but should the wind increase in power the weighted end of the lever O is raised and the wheel is turned out of the wind by the force of the wind itself. As the force of the wind decreases, the weighted lever O Q again draws the wind-wheel into the wind.

To the other side of the cross-bar of the frame H is rigidly attached a curved arm, R, to the outer end of which is attached the end of a rope or chain, S. The rope or chain S passes around a guide-pulley, T, pivoted in a short slot in the lower part of the side bar of the frame G, so that the wheel can be turned out of the wind, when desired, by drawing upon the rope or chain S.

To the projecting end of the lower cross-bar of the frame G is attached a stop block or arm, U, for the cross-bar of the frame H to strike against, to prevent the wheel from being drawn any farther than fully into the wind by the weighted lever O Q.

To the end of the forward journal of the wind-wheel K J L M is attached a crank-wheel or crank, V, to the crank-pin of which is pivoted the end of the pitman W, which is jointed, so that its lower part may move up and down in a vertical line, while its upper part is carried through the circumference of a circle by the crank V. The lower part of the pitman W passes down through a guide-hole in the lower cross-bar of the frame G and through the cavity of the pivot B of the post C. With this construction the post C and all its attachments turn as the direction of the wind changes, and the frame H turns upon the frame G as the wheel K J L M is thrown into and out of the wind.

To the inner end of the lower cross-bar of the frame G is hinged the upper end of a ladder, X, which is made in sections, hinged to each other. The ladder X passes down along the side of the post C, and its lower end rests upon a block, Y, attached to the lower end of the post C.

To a jointed support, Z, attached to the base-frame A, is pivoted a lever, a, in such a position that its forward end may engage with the pins or rounds of the ladder-sections X, so that the frame G and its attachments may be raised and lowered by operating the said lever, the joint of the support Z allowing the lever a to adjust itself as the ladder X is raised and lowered. As the frame G and its attachments are lowered the sections of the ladder X are successively swung outward, and as the said frame is raised the ladder-sections drop into place. When the wheel is in use the ladder-section that rests upon the block Y is secured in place by a clamp, b, passing around the post C and the lowest ladder-section.

Having thus described my invention, I claim as new and desire to secure by Letters Patent—

1. A windmill constructed substantially as herein shown and described, consisting of the base-frame A, the pivoted post C, the sliding frame G, the pivoted frame H, the wind-wheel K J L M, the weighted lever O Q, the sectional ladder X, and the lever a and its jointed support Z, as set forth.

2. In a windmill, the combination, with the pivoted supporting-post C and the wind-wheel K J L M, of the sliding frame G, the pivoted frame H, and the weighted lever O Q, substantially as herein shown and described, whereby the wind-wheel is made to adjust itself to the wind automatically, as set forth.

3. In a windmill, the combination, with the pivoted post C and the sliding frame G, that carries the pivoted frame H, and the wind-wheel K J L M, of the ladder X, made in sections, hinged to each other, and the lever a and its jointed support Z, substantially as herein shown and described, whereby the wind-wheel can be raised and lowered, as set forth.

WILLIAM RILEY HOWE.

Witnesses:
A. L. ORMSBE,
W. R. ORMSBE.